United States Patent
Park

[19]

[11] Patent Number: 5,980,422
[45] Date of Patent: Nov. 9, 1999

[54] HYDRAULIC CONTROL SYSTEM USED IN AUTOMATIC TRANSMISSION FOR VEHICLE

[75] Inventor: Donghoon Park, Youngin-kun, Rep. of Korea

[73] Assignee: Hyundai Motor Company, Seoul, Rep. of Korea

[21] Appl. No.: 08/917,860

[22] Filed: Aug. 27, 1997

[30] Foreign Application Priority Data

Aug. 30, 1996 [KR] Rep. of Korea ..................... 96-36726

[51] Int. Cl.⁶ .................................................. F16H 61/20
[52] U.S. Cl. ............................................. 477/93; 477/114
[58] Field of Search ............................... 477/92, 93, 114, 477/127, 130, 131

[56] References Cited

U.S. PATENT DOCUMENTS

| | | | |
|---|---|---|---|
| 4,513,638 | 4/1985 | Nishikawa et al. | 477/114 |
| 4,513,639 | 4/1985 | Hiramatsu | 477/114 |
| 4,561,328 | 12/1985 | Hiramatsu | 477/114 |
| 4,648,289 | 3/1987 | Kubo et al. | 477/93 |
| 4,840,092 | 6/1989 | Sakaguchi et al. | 477/93 |
| 4,850,251 | 7/1989 | Kuwayama et al. | 477/114 |
| 5,692,990 | 12/1997 | Tsukamoto et al. | 477/93 |
| 5,906,559 | 5/1999 | Murasugi et al. | 477/93 |

*Primary Examiner*—Charles A. Marmor
*Assistant Examiner*—Scott Lund
*Attorney, Agent, or Firm*—Birch, Stewart, Kolasch & Birch, LLP

[57] ABSTRACT

The hydraulic control system includes a pressure regulating valve regulating hydraulic pressure generated by a hydraulic pump, and a pressure control valve controlling the regulated hydraulic pressure. A hydraulic pressure distributing valve set distributes the controlled regulated hydraulic pressure to a plurality of friction elements, and a shift control valve controls operation of the hydraulic pressure distributing valve set by controlling distribution of an application hydraulic pressure to the hydraulic pressure distributing valve set. A creep control unit selectively prevents the vehicle from creeping without depressing a brake pedal by supplying the application hydraulic pressure from the shift control valve to at least one of the friction elements. To this end, the creep control unit includes a creep control valve and a solenoid valve.

6 Claims, 2 Drawing Sheets

HYDRAULIC CONTROL SYSTEM USED IN AUTOMATIC TRANSMISSION FOR VEHICLE

FIELD OF THE INVENTION

The present invention relates to a hydraulic control system used in an automatic transmission for a vehicle. More particularly, the invention relates to a hydraulic control system including a creep control means.

BACKGROUND OF THE INVENTION

Generally, a conventional automatic transmission for a vehicle includes a torque converter, a multi-stage gear shift mechanism connected to the torque converter, and a plurality of friction elements actuated by hydraulic pressure for selecting a gear stage of the gear shift mechanism.

In such hydraulic control systems, hydraulic pressure generated by a hydraulic pump is selectively supplied to each friction element by a plurality of control valves such that automatic shifting is realized in accordance with a driving state of the vehicle and engine throttle opening.

The above hydraulic control system generally comprises a pressure regulating controller for controlling hydraulic pressure generated by the hydraulic pump, manual and automatic shift controllers for selecting a shift mode, a hydraulic pressure controller for controlling shift response and shift quality, a damper clutch controller for actuating a damper clutch of the torque converter, and a hydraulic pressure distributor for supplying an appropriate amount of hydraulic pressure to each of the friction elements.

The hydraulic pressure distributor distributes a variable amount of pressure in accordance with an ON/OFF or duty operation of solenoid valves by a transmission control unit such that shift control is realized.

In such a hydraulic control system, because at least one input element is being operated in a first speed of a drive D range, a shifting operation is performed in a powertrain and torque is transmitted to wheels of the vehicle.

As a result of this transmission of torque, a creep state results in which the vehicle moves even when an accelerator pedal is not depressed by the driver. Therefore, a brake pedal must be kept depressed in order to maintain the vehicle in a standstill state. This can be very inconvenient when needing to stop for long periods while keeping the engine running up as when stopped at a red light or stuck in traffic.

SUMMARY OF THE INVENTION

The present invention has been made in an effort to solve the above problems.

It is an object of the present invention to provide a hydraulic control system for automatic transmissions including a creep control means for controlling creep state which is able to prevent a vehicle from creeping without depressing a brake pedal when the vehicle is temporarily stopped in a first speed of a drive D range.

To achieve the above object, the present invention provides a hydraulic control system used in an automatic transmission for a vehicle, which comprises pressure regulating means for regulating hydraulic pressure generated by an hydraulic pump, shift control means for selecting a shift mode, hydraulic pressure control means for controlling shift response and shift quality, hydraulic pressure distributing means for suitably distributing pressure to each friction element including a kickdown servo, and creep control means for selectively preventing the vehicle from creeping without depressing a brake pedal after the vehicle is temporarily stopped in a first speed state by supplying application pressure from the shift control means to an application chamber of the kickdown servo.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
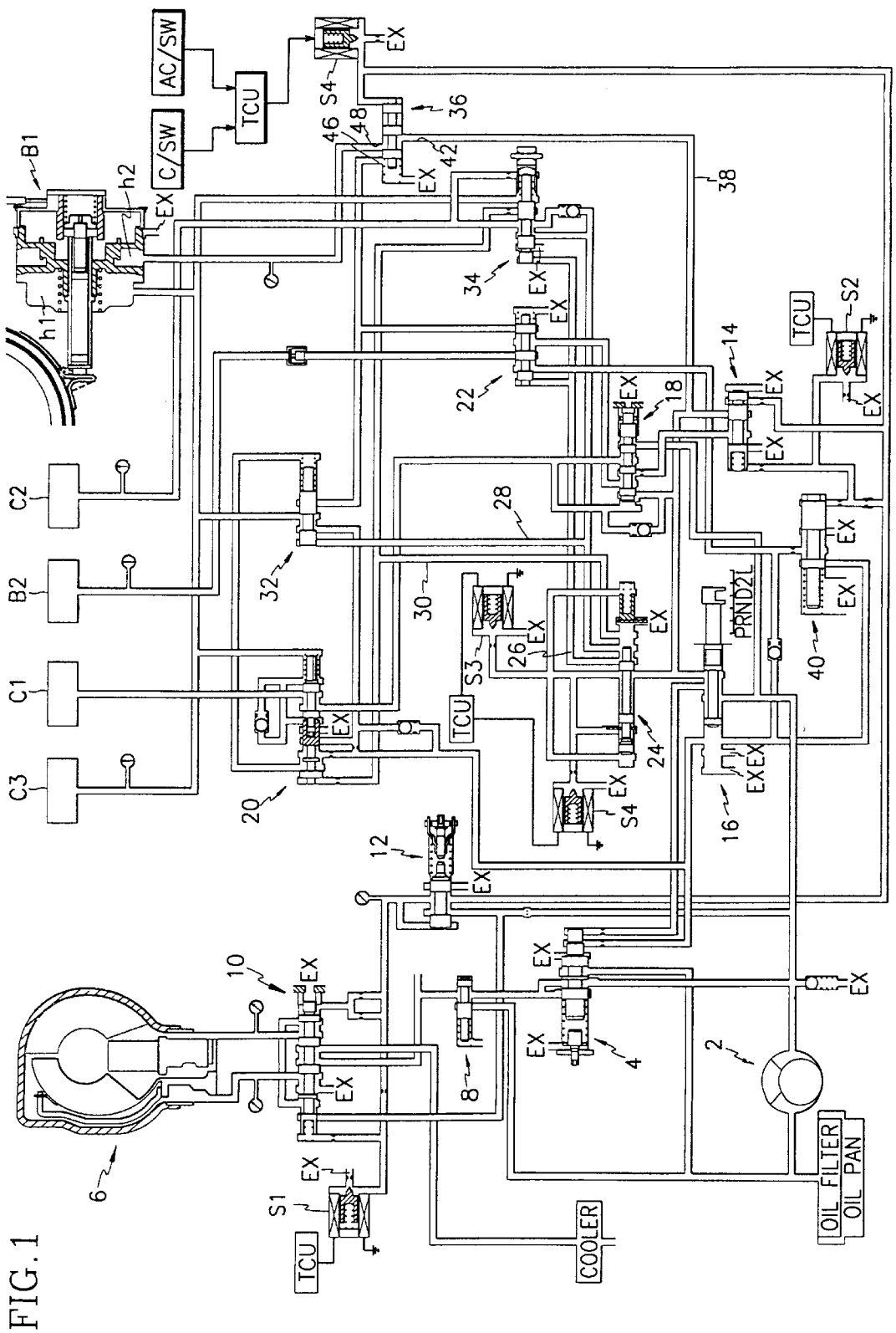
FIG. 1 is a hydraulic circuit diagram of a hydraulic control system including creep control means according to a preferred embodiment of the present invention.

Preferred embodiments of the present invention will now be described in detail with reference to the accompanying drawings.

Certain terminology will be used in the following description for convenience and reference only and will not be limiting. The words "right" and "left" will designate directions in the drawings to which reference is made.

FIG. 1 shows a hydraulic circuit diagram of a hydraulic control system including creep control means according to a preferred embodiment of the present invention.

A hydraulic pump 2 pumping fluid and which is powered by an engine is connected to a regulator valve 4 through a line such that hydraulic pressure generated from the hydraulic pump 2 is able to be regulated to a suitable level of line pressure.

The regulator valve 4 supplies line pressure to a torque converter control valve 8 which regulates hydraulic pressure levels for controlling a torque converter 6 and for lubricating parts of the transmission system. The torque converter control valve 8 supplies the regulated pressure to a damper clutch control valve 10 controlled by a damper clutch control solenoid valve S1 such that power transmitting efficiency of the torque converter 6 is improved.

The line pressure is supplied to a reducing valve 12 which decreases the level of hydraulic pressure and supplies the reduced pressure to a pressure regulating valve 14 of pressure control means.

The pressure regulating valve 14 supplies hydraulic pressure supplied from a manual valve 16 to a 1-2 shift valve 22 or a rear clutch release valve 20 of hydraulic pressure distributing means through a N-D control valve 18 by a pressure control solenoid valve S2 controlled by a transmission control unit (TCU).

The N-D control valve 18 reduces shift shock when manually shifting from a neutral N range to a drive D range. The N-D control valve 12 supplies the control pressure supplied from the pressure regulating valve 14 to a rear clutch C1 at an initial state.

The manual valve 16 is indexed with a selector lever to supply hydraulic pressure to each valve or exhaust hydraulic pressure through exit ports.

Part of the hydraulic pressure supplied from the manual valve 16 is supplied to a shift control valve 24 for selecting lines through which fluid flows in accordance with operation of two solenoid valves S3 and S4 ON/OFF-controlled by the TCU. The hydraulic pressure supplied from the shift control valve 24 selectively flows through one of three lines 26, 28, and 30 by the control solenoid valves S3 and S4.

The line 26 is branched off to be connected to the 1-2 shift valve 22 and an end clutch valve 34 to supply hydraulic pressure to these valves 22 and 34. The line 28 supplies hydraulic pressure to a 2-3/4-3 shift valve 32 and is branched off to supply hydraulic pressure to an end clutch C2 via the end clutch valve 34.

The 2-3/4-3 shift valve 32 supplies the hydraulic pressure supplied from the 1-2 shift valve 22 to a front clutch C3 and part of the hydraulic pressure is supplied to a release chamber h1 of a kickdown servo B1.

An application chamber h2 of the kickdown servo B1 receives hydraulic pressure supplied from the 1-2 shift valve 22 through a creep control valve 36 which acts to supply or block the supply of the hydraulic pressure to the application chamber h2 through port conversion by the creep control solenoid valve S4 controlled by the TCU.

The creep control valve 36 receives the line pressure from the manual valve 16 through a line 38.

An N-R control valve 40, which reduces shift shock when shifting from the neutral N range to a reverse R range, supplies hydraulic pressure to a low-reverse brake B2 via the 1-2 shift valve 22 by realizing port conversion through operation of the pressure control solenoid valve S2.

Figure 2:
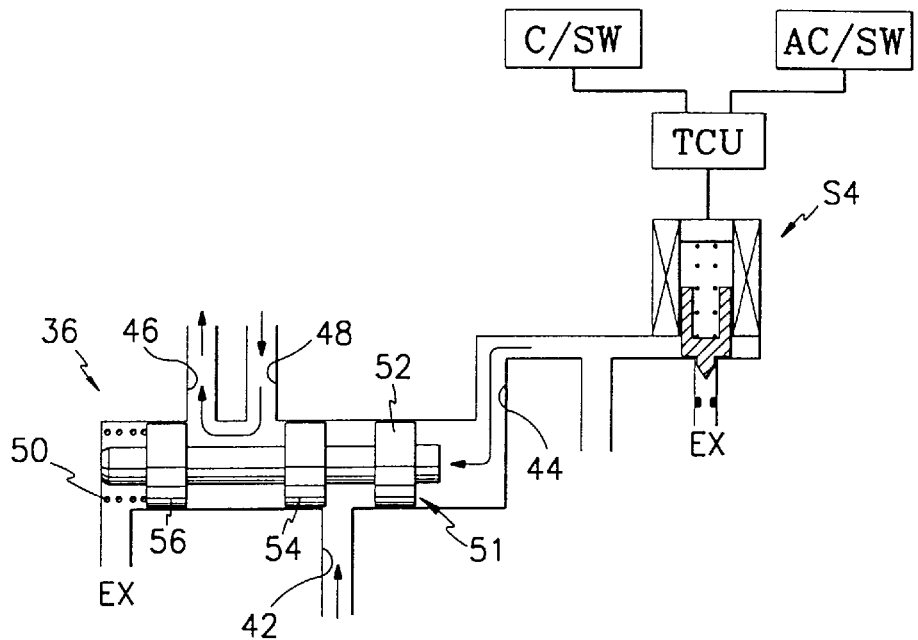
FIG. 2 is an enlarged view of the creep control means of FIG. 1 in a state where creeping is allowed.
Figure 3:
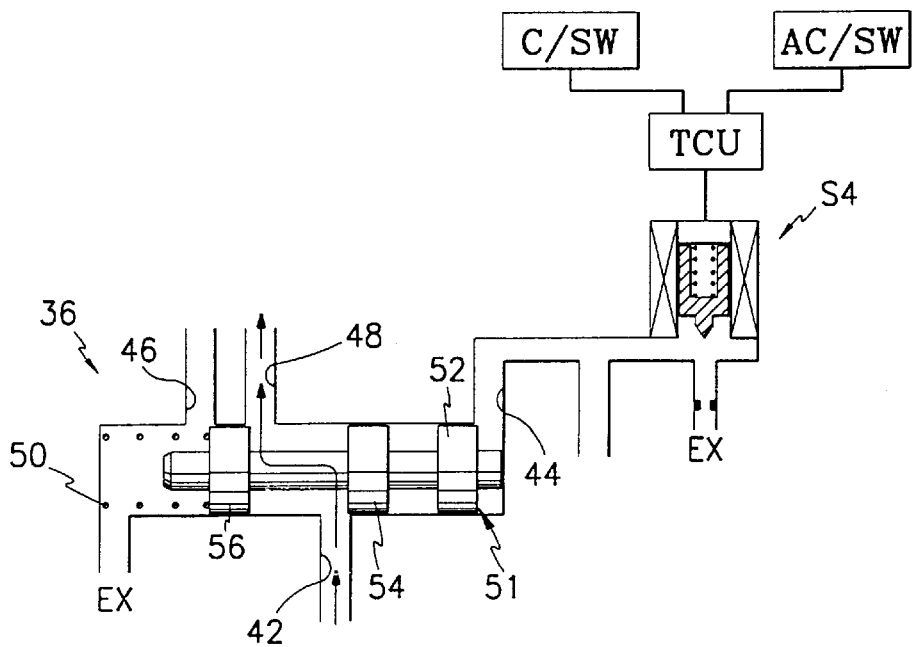
FIG. 3 is an enlarged sectional view of the creep control means of FIG. 2 in a state where creeping is disallowed.

FIGS. 2 and 3 illustrate the creep control valve 36 according to a preferred embodiment of the present invention. The creep control valve 36 includes a port 42 supplied with line pressure from the manual valve 16, a port 44 supplied with reduced pressure from the reducing valve 12, a port 46 supplied with hydraulic pressure from the 1-2 shift valve 22, and a port 48 supplying operational pressure to the application chamber h2 of the kickdown servo B1.

As shown in FIGS. 2 and 3, the creep control valve 36 includes a valve spool 51 which opens or closes the above ports 42, 44, 46, and 48 by a plurality of lands formed thereon. One side of the valve spool 51 is biased in a direction toward the port 44 by an elastic member 50. The hydraulic pressure supplied to the port 44 provides biasing force against the valve spool 51 in a direction opposite that of the elastic member 50. The hydraulic pressure supplied to the port 44 is applied a first land 52. The valve spool 51 further includes a second land 54 adjacent to the first land 52 and which allows or blocks hydraulic pressure to pass between the port 42 and the port 48, and a third land 56 adjacent to the second land 54 and which allows or blocks hydraulic pressure to pass between the port 46 and the port 48.

Each reaction area of the above lands 52, 54, and 56 is formed identical to one another. Further, an exit port Ex is formed an area where the elastic member 50 is provided.

In the creep control valve 36 structured as in the above, when the vehicle is travelling in a normal shift pattern, the valve spool 51 of the creep control valve 36 is maintained to the left by the creep control solenoid valve S4. That is, the reduced pressure supplied from the reducing valve 12 flows into the port 44 to act on a right side of the first land 52 such that the valve spool 51 is displaced towards the left as shown in FIG. 2 while overcoming the elastic force of the elastic member 50.

Such control is performed in a second and fourth speed of the drive D range. Here, because the application chamber h2 of the kickdown servo B2 is able to receive hydraulic pressure, a shift control is able to be realized by selecting reaction elements in the shift mechanism.

Further, in the above control state, creeping is allowed when the vehicle is temporarily stopped in the first speed of the drive D range.

An input terminal of the TCU is connected to a control switch (C/Sw) for controlling the operation of the creep control valve 36, as shown in FIG. 3.

Accordingly, as a signal disallowing a creep is transmitted from the TCU to the creep control solenoid valve S4 in accordance with an switching operation of the control switch (C/Sw), the reduced pressure supplied from the reducing valve 12 is exhausted such that hydraulic pressure which has been applied to the first land 52 is released.

As a result, the valve spool 51 of the creep control valve 36 is displaced towards right by elastic force of the elastic member 50 to communicate the port 42 with the port 48 such that the line pressure supplied from the port 42 is supplied to the application chamber h2 of the kickdown servo B1 through the port 48.

Namely, the line pressure supplied from the manual valve 16 is directed to the application chamber h2 through the port 48.

By this control, the vehicle temporarily stopped in the first speed is not in a creep state, but in a standstill state. In this standstill state, if the driver depresses an accelerator pedal, because an accelerator pedal switch AC/Sw connected to the input terminal of the TCU is controlled to ON, the TCU controls the creep control solenoid valve S4 a state as shown FIG. 2.

As described above, because the creep control means in accordance with the present invention enable the driver to optionally select a creep, if necessary, when the driver selects a creep disallowing mode, the driver can maintain the vehicle in a standstill state without depressing the brake pedal after the vehicle is temporarily stopped in the first speed.

What is claimed is:

1. A hydraulic control system for an automatic transmission of a vehicle, comprising:

a pressure regulating valve regulating hydraulic pressure generated by a hydraulic pump;

a pressure control valve controlling the regulated hydraulic pressure;

hydraulic pressure distributing means distributing the controlled regulated hydraulic pressure to a plurality of friction elements;

a shift control valve controlling operation of the hydraulic pressure distributing means by controlling distribution of an application hydraulic pressure to the hydraulic pressure distributing means;

a manual valve supplying the application hydraulic pressure;

a reducing valve supplying a reduced hydraulic pressure;

a creep control valve selectively supplying at least the application hydraulic pressure to a kick-down servo in the plurality of the friction elements based on the reduced hydraulic pressure; and a creep control solenoid valve controlling operation of the creep control valve by controlling the reduced hydraulic pressure.

2. The hydraulic control system of claim 1, wherein the creep control valve comprises:

- a first port supplied with the application hydraulic pressure;
- a second port supplied with the reduced hydraulic pressure from the reducing valve;
- a third port supplied with the controlled regulated hydraulic pressure from the hydraulic pressure distributing means; and
- a fourth port connected to the application chamber of the kick-down servo.

3. The hydraulic control system of claim 1, further comprising:

- a creep control switch; and
- a transmission control unit controlling the creep control solenoid valve in accordance with operation of the creep control switch.

4. The hydraulic control system of claim 3, wherein the creep control switch has a creep disallowing mode and a creep allowing mode.

5. The hydraulic control system of claim 4, wherein, when the creep control switch is switched to the creep disallowing mode, the transmission control unit prevents the vehicle from creeping without depressing a brake pedal when the vehicle is stopped, the shift control valve is disposed in a first speed position and the creep control solenoid valve is controlled to ON.

6. The hydraulic control system of claim 4, further comprising:

- an accelerator pedal switch; and wherein
- the transmission control unit controls the creep control solenoid valve to allow creeping when the accelerator pedal switch is actuated to cause vehicle motion.

* * * * *